US009958853B2

(12) United States Patent
Ito et al.

(10) Patent No.: US 9,958,853 B2
(45) Date of Patent: May 1, 2018

(54) NUMERICAL CONTROLLER HAVING TAPER ANGLE COMPENSATING FUNCTION OF TAPER MACHINING IN SKIVING

(71) Applicant: FANUC CORPORATION, Minamitsuru-gun, Yamanashi (JP)

(72) Inventors: Motohiko Ito, Yamanashi (JP); Osamu Nakajima, Yamanashi (JP)

(73) Assignee: FANUC CORPORATION, Minamitsuru-gun, Yamanashi ( * ) Notice: Subject to any disclaimer, the term of this patent is extended or adjusted under 35 U.S.C. 154(b) by 0 days. days.

(21) Appl. No.: 15/439,338

(22) Filed: Feb. 22, 2017

(65) Prior Publication Data
US 2017/0242422 A1 Aug. 24, 2017

(30) Foreign Application Priority Data
Feb. 23, 2016 (JP) ................................. 2016-032284

(51) Int. Cl.
*B23B 5/16* (2006.01)
*G05B 19/29* (2006.01)
(52) U.S. Cl.
CPC ................ *G05B 19/29* (2013.01); *B23B 5/16* (2013.01); *G05B 2219/34015* (2013.01)
(58) Field of Classification Search
CPC ....... B23B 5/16; B23B 49/00; B23B 2270/48; G05B 2219/36342; G05B 19/4166; G05B 19/4093; G05B 19/4155; B23C 220/48; B23C 220/04; B23C 220/08; B23C 220/12
See application file for complete search history.

(56) References Cited

U.S. PATENT DOCUMENTS

| 4,053,819 A * | 10/1977 | Matsumoto .......... G05B 19/186 318/569 |
| 4,740,902 A * | 4/1988 | Yoneda .............. G05B 19/4093 700/164 |
| 5,037,248 A * | 8/1991 | Heffron ................ B23D 37/005 407/12 |
| 5,076,744 A * | 12/1991 | Kitagawa ................. B23G 1/34 409/66 |
| 5,368,425 A * | 11/1994 | Mills ........................ B23Q 1/01 408/234 |
| 2003/0089204 A1 | 5/2003 | Schreiber et al. |
| 2017/0153623 A1* | 6/2017 | Tsuchiya .............. G05B 19/042 |

FOREIGN PATENT DOCUMENTS

JP 2003-516868 A 5/2003

* cited by examiner

*Primary Examiner* — Will Fridie, Jr.
(74) *Attorney, Agent, or Firm* — Ratner Prestia

(57) ABSTRACT

A numerical controller stores tool data (including information on an inclination and length of a linear blade of a tool), reads an instruction block from a program, analyzes the instruction block, and generates instruction data indicating a movement amount of the tool on each axis instructed by the instruction block. Further, when performing taper machining, the numerical controller calculates a compensating amount for compensating an instructed path, based on the stored tool data, such that an actually-machined taper angle matches a taper angle instructed by the instruction block, compensates the generated instruction data based on the calculated compensating amount, and outputs the compensated instruction data.

3 Claims, 9 Drawing Sheets

⟶ COMPENSATED TOOL PATH OF PROGRAM INSTRUCTION
—·—·⟶ TOOL PATH OF PROGRAM INSTRUCTION
— — —⟶ CUTTING PATH AFTER COMPENSATION
········⟶ CUTTING PATH BEFORE COMPENSATION

–·–·▶ TOOL PATH OF PROGRAM INSTRUCTION

– – – ▶ CUTTING PATH IN CASE WHERE TOOL IS NOT INCLINED IN X AXIS DIRECTION

········▶ CUTTING PATH IN CASE WHERE TOOL IS INCLINED IN X AXIS DIRECTION

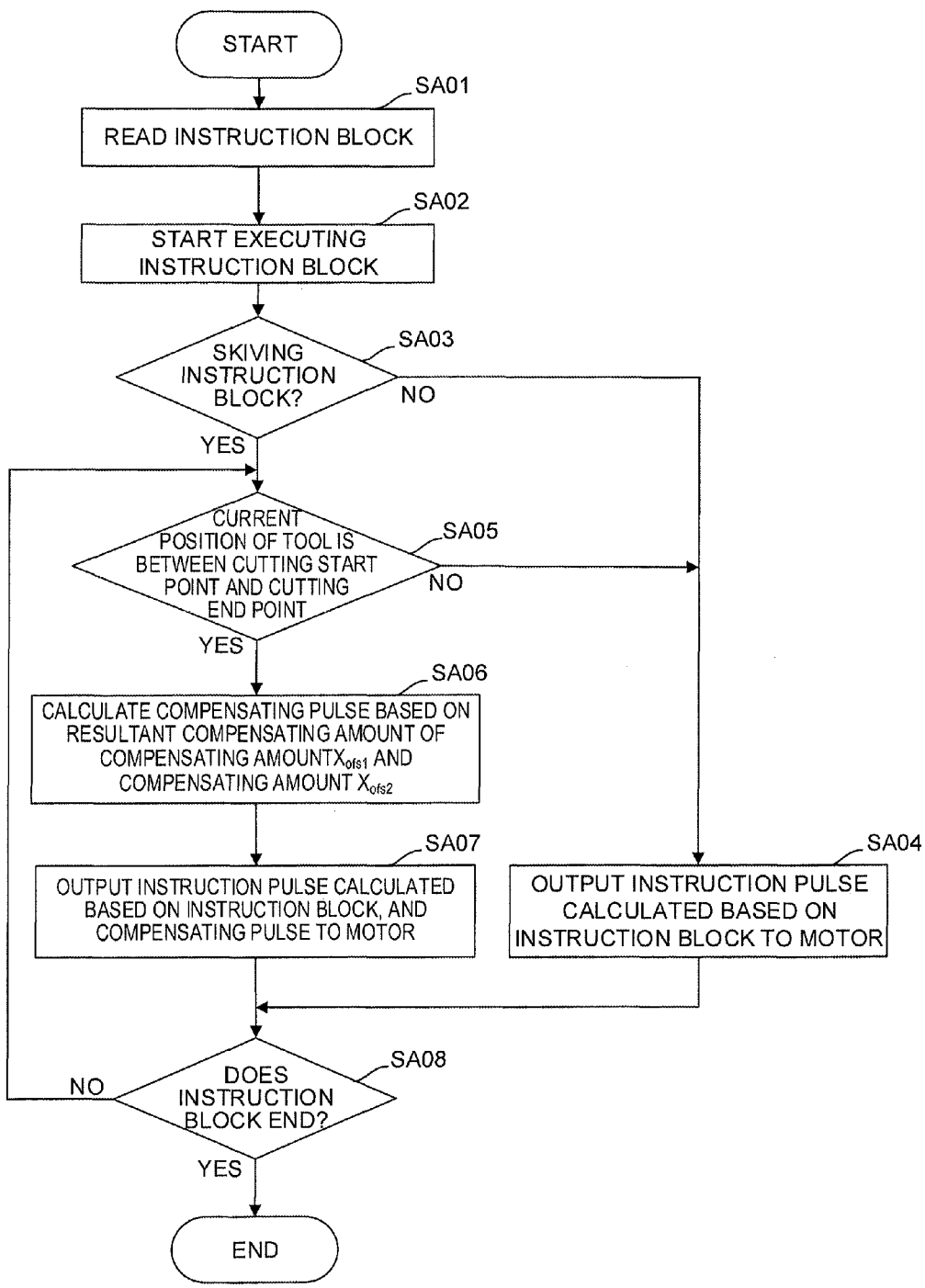

WHEN SEEN FROM Y AXIS NEGATIVE DIRECTION

WHEN SEEN FROM X AXIS POSITIVE DIRECTION

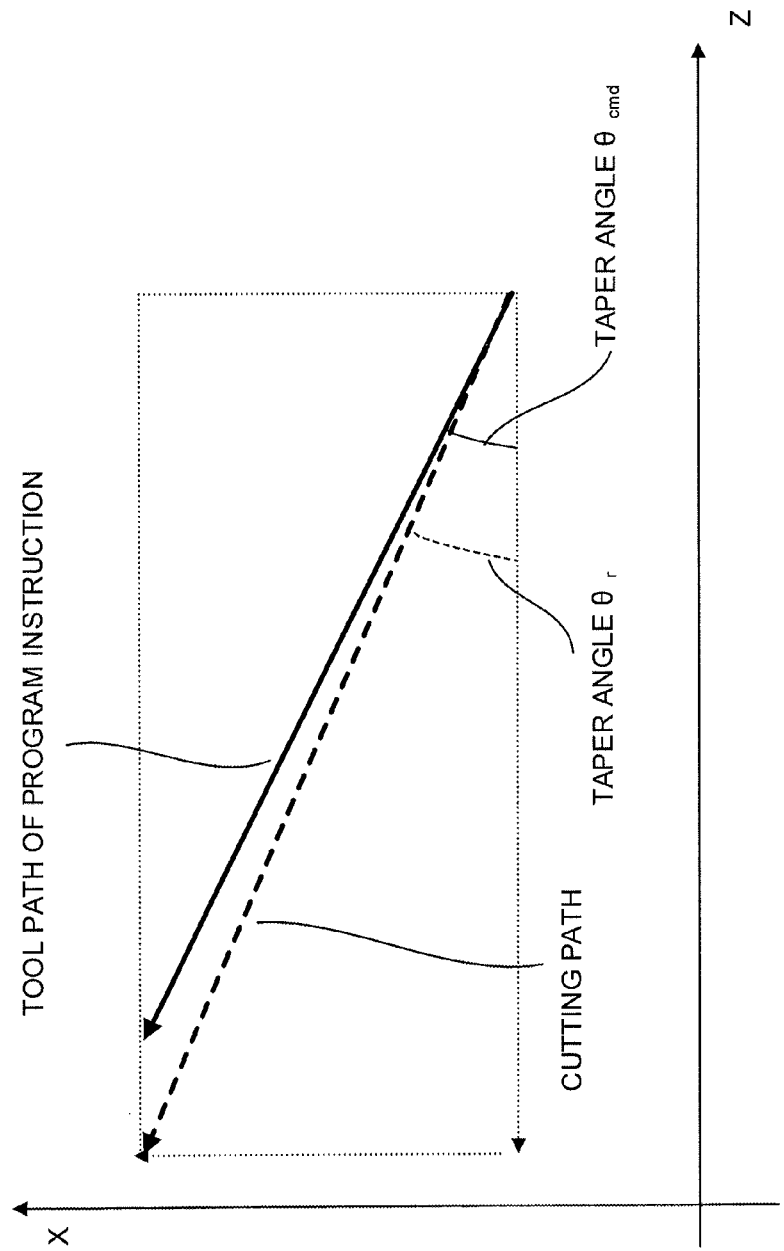

WHEN SEEN FROM Y AXIS NEGATIVE DIRECTION

NUMERICAL CONTROLLER HAVING TAPER ANGLE COMPENSATING FUNCTION OF TAPER MACHINING IN SKIVING

BACKGROUND OF THE INVENTION

1. Field of the Invention

The present invention relates to a numerical controller and, more particularly, relates to a numerical controller which includes a taper angle compensating function of taper machining in skiving.

2. Description of the Related Art

Skiving refers to a machining method for cutting a workpiece by feeding a cutting tool in a tangential direction of the workpiece when cutting the workpiece by using the turning machine (JIS Standard B0106 0.209). Skiving is performed, in a turning machine, by using a tool having a linear blade disposed diagonally with respect to an axis of rotation of a workpiece on a YZ plane and moving the tool on a Z axis and a Y axis (see, for example, JP 2003-516868 A (corresponding to WO01/043902)).

In a skiving work using a turning machine, machining of a tapered shape can be carried out in taper machining by moving an X-axis following the moving of a Z-axis and a Y-axis, making a diagonal movement instruction, as illustrated in FIGS. 7A and 7B.

However, in skiving work in a turning machine, a position (cutting point 5) at which a linear blade 41 contacts a workpiece 3 changes from a point of cutting start time to a point of cutting end time. Therefore, as illustrated in FIG. 8, a movement amount of the Z axis in a cutting path is larger than a movement amount of the tool 4 on the Z axis instructed by a program instruction (note that a scale of FIG. 8 is enlarged in an X axis direction in order to make these figures clearly understandable). Therefore, there is a problem that, if the movement amount of the X axis based on a program instruction is simply determined on the basis of the movement amount of the Z axis based on the program instruction, a taper angle $\theta_r$ in an actual cutting path does not match with a taper angle $\theta_{cmd}$ which is determined by the movement amount of the X axis and the movement amount of the Y axis based on the program instruction.

Further, as illustrated in FIGS. 9A and 9B, when the tool 4 is inclined due to an attachment error or the like, a position of the cutting point 5 on an X axis coordinate changes from the point of cutting start time to the point of cutting end time. Hence, there is a problem that a taper angle after machining changes due to change in a position of the cutting point 5 on the X axis coordinate from the point of cutting start time and the point of cutting end time, in addition to change in a taper angle based on a difference between the movement amount of the Z axis based on the program instruction and the movement amount of the Z axis in a cutting path.

SUMMARY OF THE INVENTION

It is therefore an object of the present invention to provide a numerical controller which performs control so that a taper angle instructed in taper machining in skiving using a turning machine may match a taper angle produced in actual machining.

The numerical controller according to the present invention has a function of, when performing taper machining in skiving using a turning machine, compensating a tool path to achieve an instructed taper angle even if a position of a cutting point at which a linear blade contact a workpiece changes from a point of cutting start time and a point of cutting end time, and compensate a displacement of the tool in the X axis direction due to an inclination of the tool.

The numerical controller according to the present invention controls a machine according to a program, wherein the machine performs skiving in which cutting is performed by relatively moving a tool with respect to a workpiece in an axial direction of a first axis, an axial direction of a second axis orthogonal to the first axis, and an axial direction of a third axis orthogonal to the first axis and the second axis, the workpiece rotates about the first axis, and the tool has a linear blade arranged substantially parallel to a plane including the first axis and the second axis and inclined with respect to the first axis. The numerical controller comprising: a tool data storage unit that stores tool data including at least information on the inclination of the linear blade with respect to the first axis and information on a length of the linear blade; an instruction block analyzing unit that reads an instruction block from the program, analyzes the instruction block and generates and outputs instruction data indicating a movement amount of the tool on each axis instructed by the instruction block; a tool movement amount compensating unit that calculates, based on at least the tool data stored in the tool data storage unit, a compensating amount for compensating the movement amount such that an actually-machined taper angle matches a taper angle instructed by an instruction block, and outputs a compensated instruction data which is obtained by compensating the instruction data, output by the instruction block analyzing unit, based on the compensating amount, in case where the instruction block instructs taper machining in which machining is performed such that a machined surface of the workpiece takes a taper angle, formed by the first angle and the third angle, with respect to the first axis, on a plane including the first axis and the third axis; and an interpolating unit that executes interpolation processing based on the instruction data or the compensated instruction data, and generates and outputs interpolation data for every interpolation cycle.

The compensating amount may be calculated based on a movement amount of the tool in the axial direction of the first axis, a movement amount of the tool in the axial direction of the third axis, and the tool data in a block in which the taper machining is instructed.

The tool data may include information related to an inclination of the linear blade with respect to the plane including the first axis and the second axis.

According to the invention, when performing taper machining in skiving performed by using a turning machine, even if a position at which a linear blade contact a workpiece changes from a point of cutting start time and a point of cutting end time, it is possible to perform machining at an instructed taper angle. Further, it is possible to cancel a displacement of the tool in an X axis direction due to an inclination of the tool. As described above, it is possible to accurately machine a tapered portion by skiving by using the turning machine.

BRIEF DESCRIPTION OF THE DRAWINGS

FIG. 5 is a flowchart of processing of executing one instruction block when taper machining, executed by a numerical controller according to the present invention, is performed in skiving by using the turning machine;

FIG. 8 is a view for explaining a change in a taper angle of taper machining in skiving.

DETAILED DESCRIPTION OF THE PREFERRED EMBODIMENTS

When performing taper machining in skiving by using a turning machine, a numerical controller according to the present invention calculates a compensating amount for compensating a displacement of a taper angle caused by a displacement between an instructed distance based on a program instruction and a cutting distance of cutting actually performed by a tool.

Figure 1A:
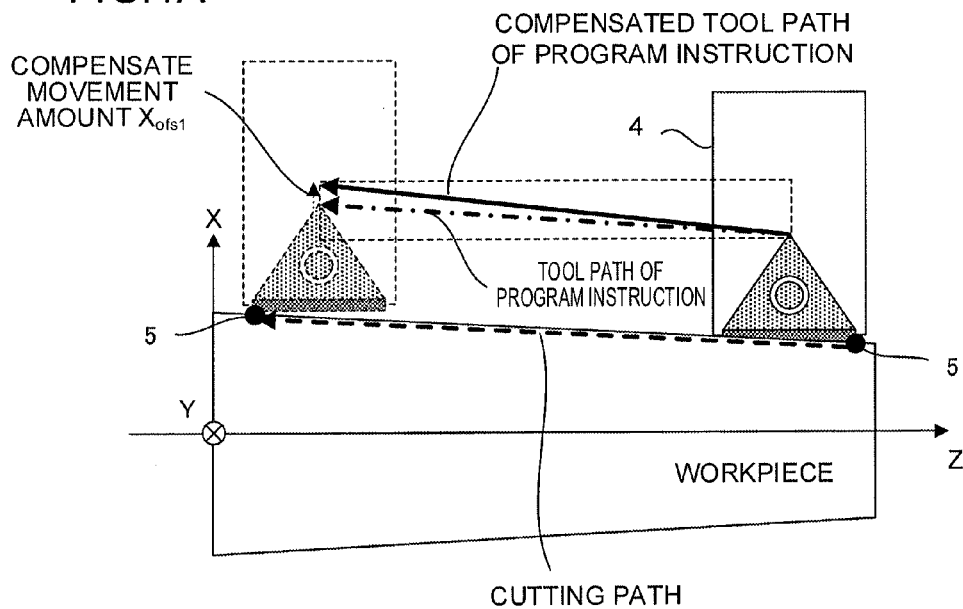
FIGS. 1A and 1B are views for explaining a method for compensating a tool path based on a program instruction according to the present invention.
Figure 1B:
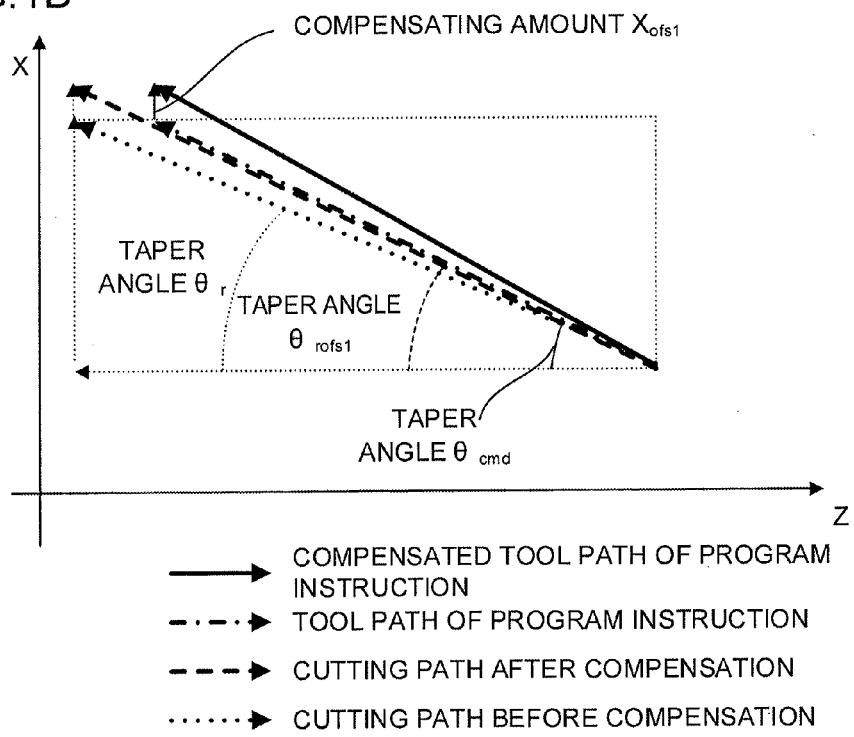

FIGS. 1A and 1B are views for explaining compensation of a tool path based on a program instruction of the numerical controller according to the present invention. Note that scales of FIGS. 1A and 1B are enlarged in an X axis direction in order to make these figures clearly understandable.

As illustrated in FIG. 8, according to taper machining in skiving by using the turning machine, a movement amount of a Z axis in an actual cutting path is larger than the movement amount of the Z axis based on a program instruction. Therefore, a taper angle $\theta_{cmd}$ determined on the basis of a movement amount of an X axis and a movement amount of the Z axis based on a program instruction and a taper angle $\theta_r$ in an actual cutting path do not match each other. Therefore, as illustrated in FIG. 1B, a compensating amount $X_{ofs1}$ for compensating the movement amount of the X axis based on the program instruction is calculated such that the taper angle $\theta_r$ in the actual cutting path matches the taper angle $\theta_{cmd}$ ($\theta_r = \theta_{cmd} = \theta_{rofs1}$).

Figure 2:
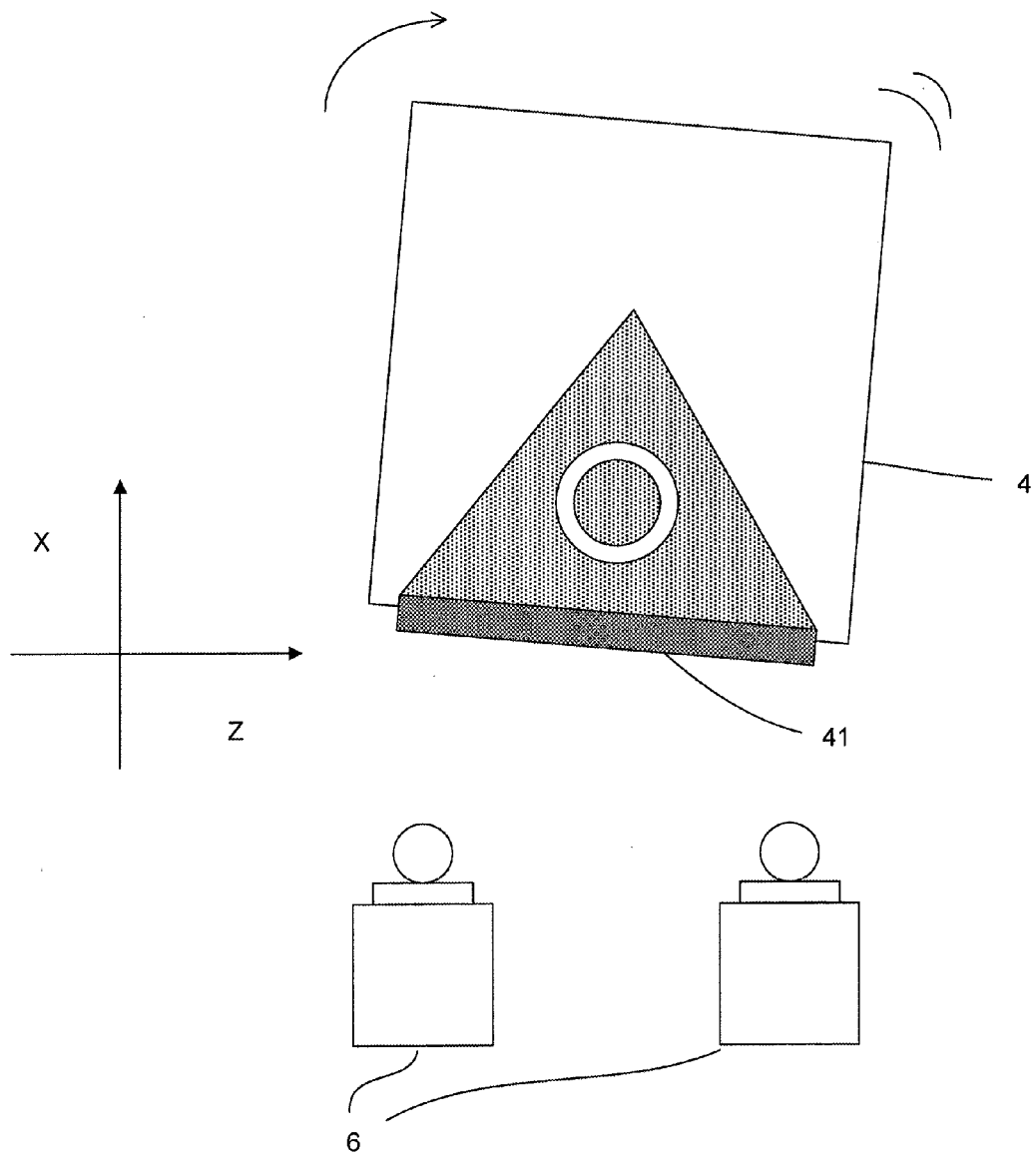
FIG. 2 is a view for explaining a method for detecting an inclination of a tool.

Further, as illustrated in FIG. 2, before start of taper machining in skiving by using the turning machine, an inclination of a tool 4 is measured by using a sensor 6 such as a touch probe, and a compensating amount $X_{ofs2}$ of a displacement in an X direction is calculated based on the measured inclination of the tool 4.

Furthermore, a movement path of the tool 4 is compensated by adding the compensating amount $X_{ofs1}$ and subtracting the compensating amount $X_{ofs2}$.

<Method for Calculating Compensating Amount $X_{ofs1}$>

Figure 3A:
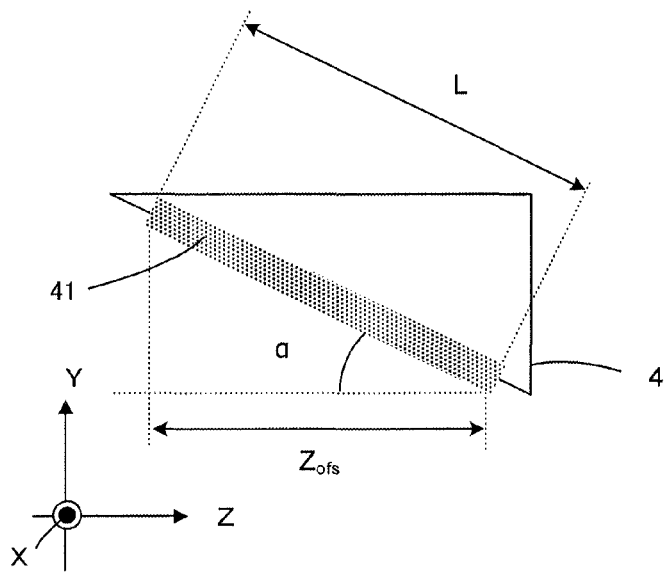
FIGS. 3A and 3B are views for explaining a method for calculating a compensating amount $X_{ofs1}$.
Figure 3B:
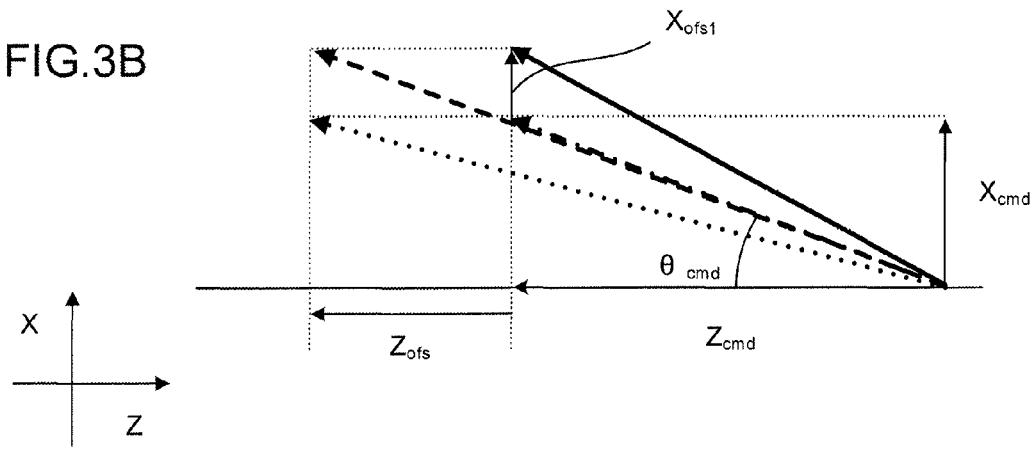

FIGS. 3A and 3B are views for explaining a method for calculating a compensating amount $X_{ofs1}$. Note that scales of FIGS. 3A and 3B are enlarged in an X axis direction in order to make these figures clearly understandable.

The numerical controller according to the present invention measures an inclination $\alpha$ of the tool 4 in a Y axis direction and a blade edge length L of the tool in advance before performing taper machining in skiving by using a turning machine. Further, based on an X axis movement amount $X_{cmd}$ and a Z axis movement amount $Z_{cmd}$ based on the program instruction, the compensated movement amount $X_{ofs1}$ of the X axis is calculated by using following equation (1) to obtain a taper amount as instructed.

$$X_{ofs1} = Z_{ofs} \times \tan \theta_{cmd} \quad (1)$$
$$= Z_{ofs} \times (X_{cmd} / Z_{cmd})$$
$$= (L \times \cos \alpha) \times (X_{cmd} / Z_{cmd})$$

where $X_{ofs1}$: compensated movement amount of X axis for obtaining a taper amount as instructed;

$Z_{ofs}$: movement amount of Z axis component accompanied by movement of Y axis;

$\theta_{cmd}$: inclination of a tool path based on program instruction in Y axis direction;

$X_{cmd}$: X axis movement amount based on program instruction;

$Z_{cmd}$: Z axis movement amount based on program instruction;

L: blade edge length of a tool;

$\alpha$: inclination of the tool in a Y axis direction

Further, for a machining block of cutting feed for which a skiving tool is selected, a compensating pulse for the X axis is created on the basis of the compensated movement amount $X_{ofs1}$ of the X axis calculated by the program instruction, and the compensating pulse of the X axis is added to an instruction pulse of the X axis in a machining block of cutting feed to output the sum. Consequently, it is possible to accurately machine a tapered portion based on the compensating pulse of the X axis added to the instruction pulse.

<Method for Calculating Compensating Amount $X_{ofs2}$>

Figure 4A:
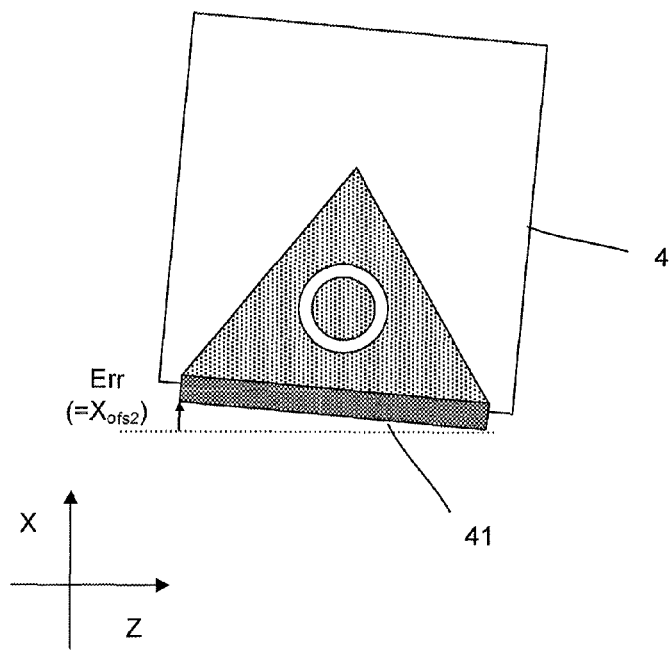
FIGS. 4A and 4B are views for explaining a method for calculating a compensating amount $X_{ofs2}$.
Figure 4B:
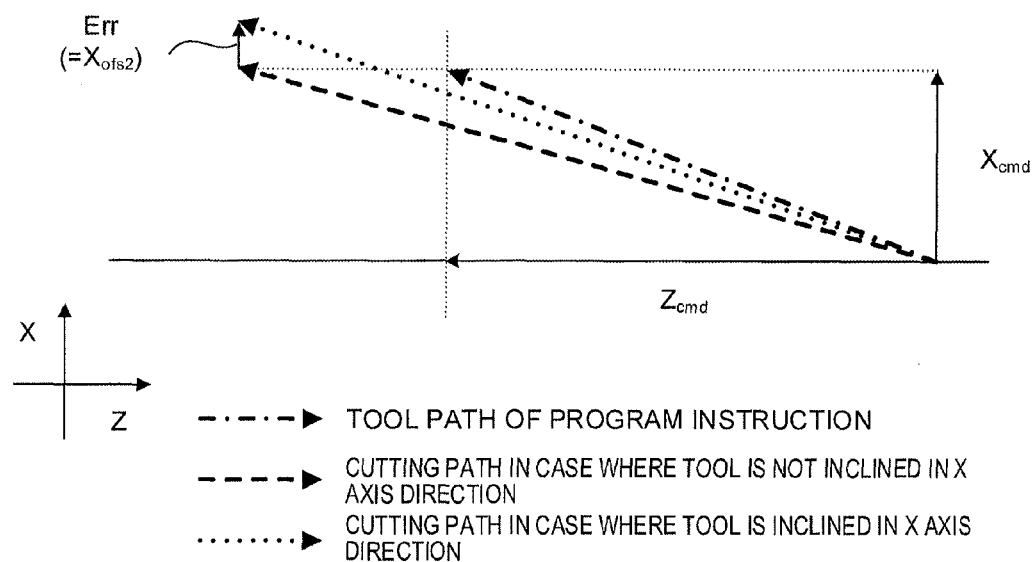

FIGS. 4A and 4B are views for explaining a method for calculating a compensating amount $X_{ofs2}$. Note that scales of FIGS. 4A and 4B are enlarged in an X axis direction in order to make these figures clearly understandable.

Before performing taper machining in skiving by using the turning machine, the numerical controller according to the present invention measures an inclination error Err ($=X_{ofs2}$) of the tool 4 at a cutting end point with respect to a cutting start point in the X axis direction in advance by using the sensor 6 such as a touch probe (see FIG. 2). Further, the inclination error Err ($=X_{ofs2}$) in the X axis direction obtained by this measurement is stored in a memory of the numerical controller.

Furthermore, for a machining block of cutting feed in which the skiving tool is selected, the numerical controller calculates a resultant compensating amount obtained by subtracting the compensating amount $X_{ofs2}$ calculated from the inclination error Err stored in the memory of the numerical controller, from the compensated movement amount $X_{ofs1}$ of the X axis calculated on the basis of a program instruction, creates a compensating pulse of the X axis based on this calculated resultant compensating amount, and adds this created compensating pulse to an instruction pulse of the X axis in a machining block of cutting feed to output the sum. With this compensating pulse of the X axis to be added to this instruction pulse, even when a linear blade 41 of the tool 4 is inclined in the X axis direction in skiving, it is possible to accurately machine a tapered portion based on a compensating pulse of the X axis to be added to this instruction pulse.

FIG. 5 is a flowchart of processing of executing one instruction block when performing a taper machining in skiving by using a turning machine, executed by a numerical controller according to the present invention.

[Step SA01] The numerical controller reads an instruction block.

[Step SA02] The numerical controller starts executing an instruction block read in step SA01.

[Step SA03] The numerical controller determines whether or not the instruction block which starts being executed is a skiving instruction block. When the instruction block is the skiving instruction block, the processing proceeds to step SA05 and, when the instruction block is not the skiving instruction block, the processing proceeds to step SA04.

[Step SA04] The numerical controller outputs the instruction pulse calculated based on the instruction block which has started being executed in step SA02, to a motor, in accordance with the movement of the tool.

[Step SA05] The numerical controller determines whether or not a current tool position is between the cutting start point and the cutting end point. When the current tool position is between the cutting start point and the cutting end point, the processing proceeds to step SA06 and, when the current tool position is not between the cutting start point and the cutting end point, the processing proceeds to step SA04.

[Step SA06] The numerical controller calculates the compensating amount $X_{ofs1}$ and the compensating amount $X_{ofs2}$ based on the above calculating method, and calculates a resultant compensating pulse based on the calculated compensating amounts.

[Step SA07] The numerical controller outputs the instruction pulse calculated based on the instruction block which has started being executed in step SA02 and the compensating pulse calculated in step SA06, to the motor, in accordance with movement of the tool.

[Step SA08] The numerical controller determines whether or not executing the instruction block has been finished. In case where executing the instruction block has been finished, this processing is finished and, in case where executing the instruction block is not yet finished, the processing proceeds to step SA05.

Figure 6:
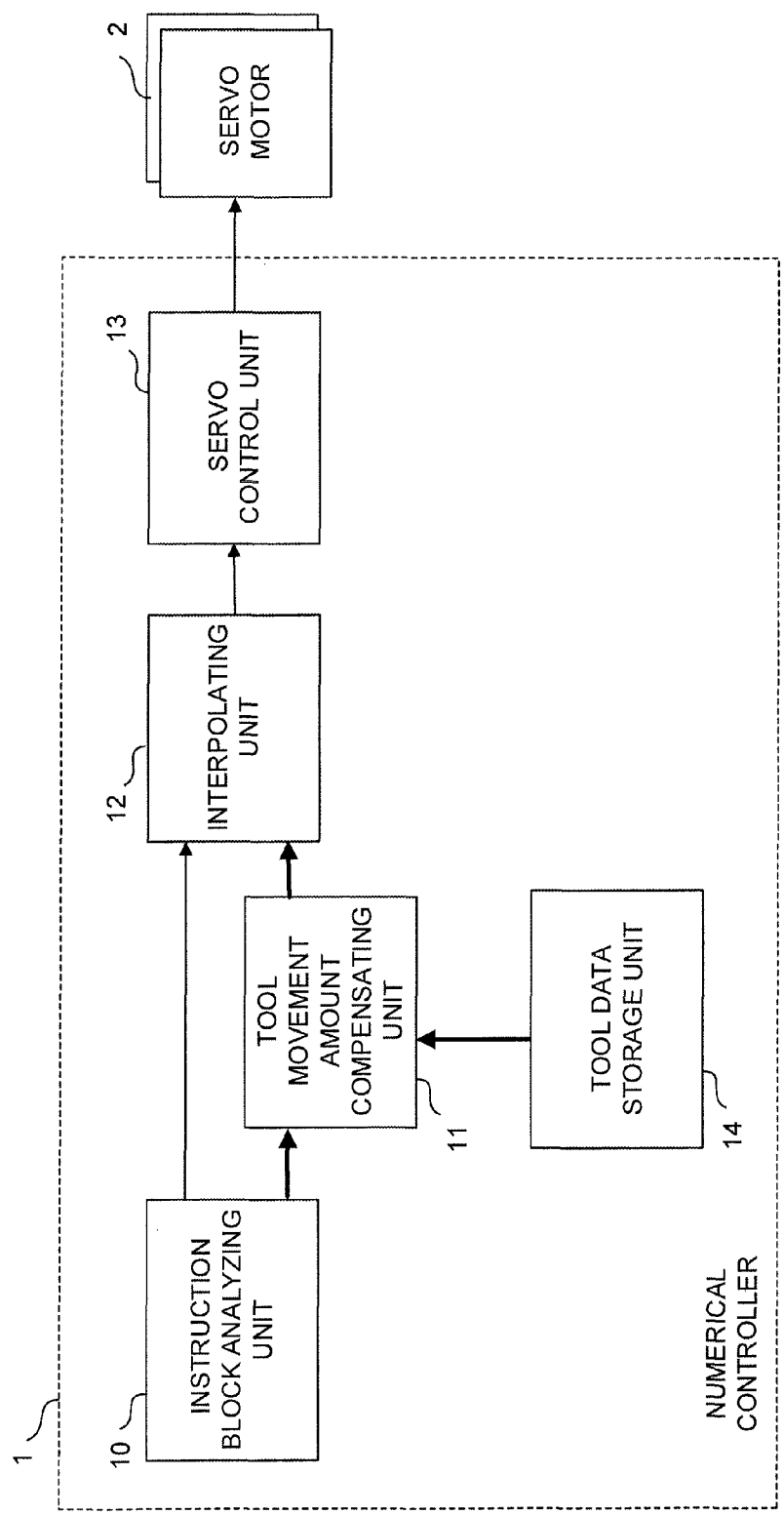
FIG. 6 is a schematic functional block diagram of the numerical controller according to one embodiment of the present invention.
Figure 7A:
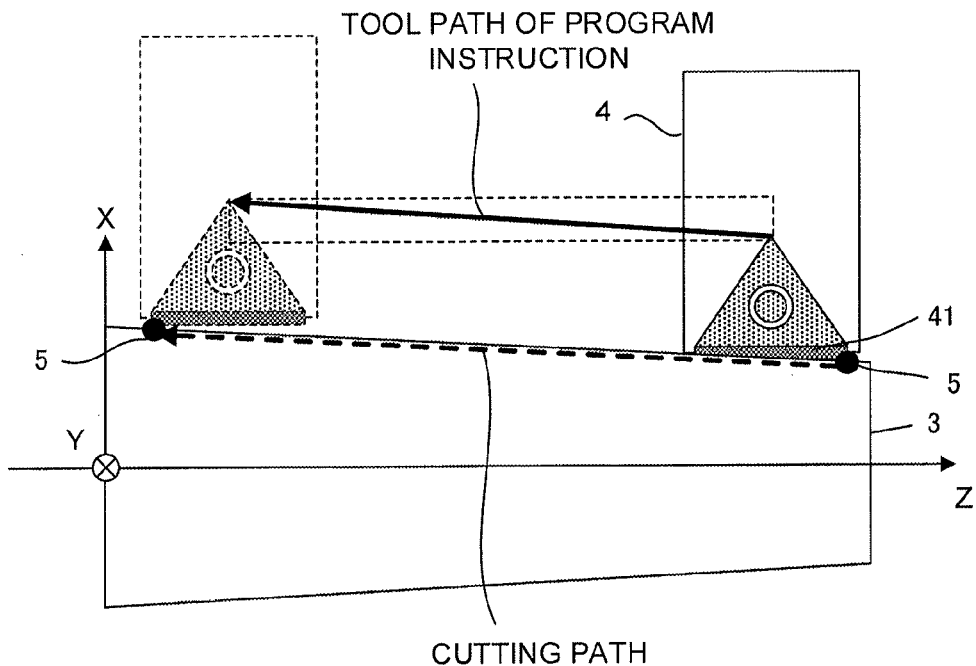
FIGS. 7A and 7B are views for explaining taper machining in skiving by using the turning machine.
Figure 7B:
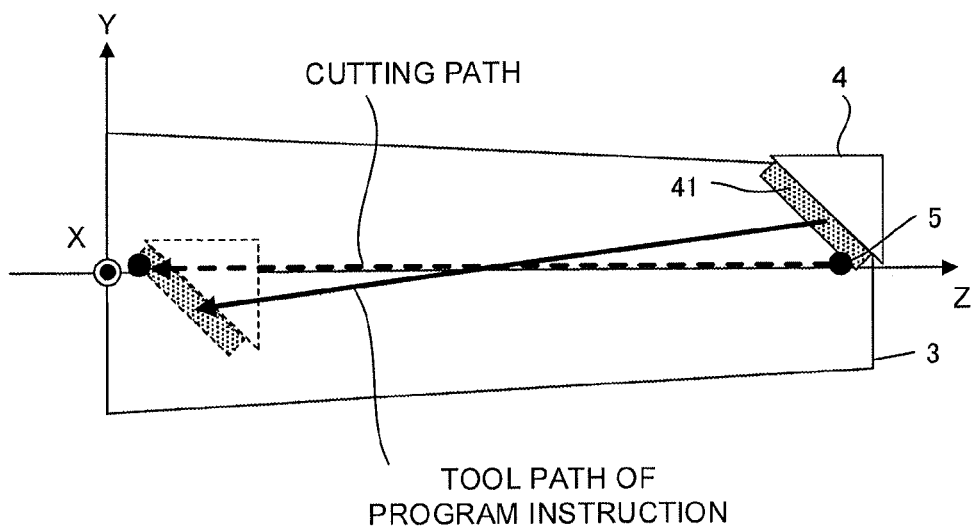
Figure 9A:
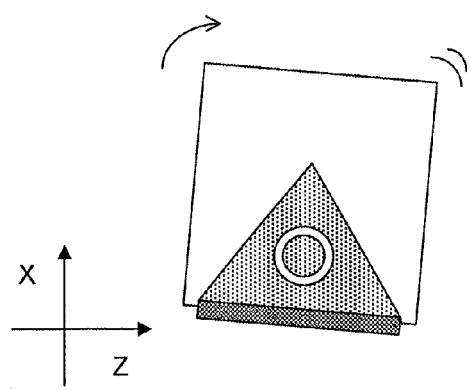
FIGS. 9A and 9B are views for explaining a change in a taper angle based on a tool inclination error.
Figure 9B:
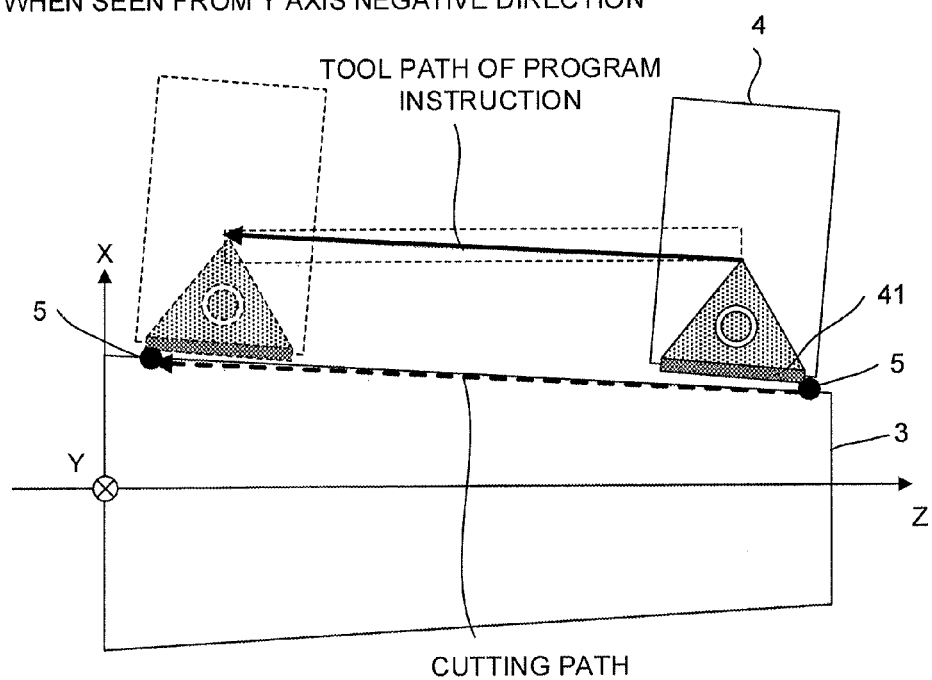

FIG. 6 is a schematic functional block diagram of the numerical controller according to one embodiment of the present invention.

A numerical controller 1 according to the present embodiment includes an instruction block analyzing unit 10, a tool movement amount compensating unit 11, an interpolating unit 12, a servo control unit 13 and a tool data storage unit 14.

The instruction block analyzing unit 10 sequentially reads instruction blocks from a program, and analyzes the programs. When this instruction block is determined to be a skiving instruction block, as a result of the analysis, the tool movement amount compensating unit 11 is instructed to compensate a movement amount of the tool instructed by this instruction block. Meanwhile, when this instruction block is determined to be a block other than skiving instruction block, the interpolating unit 12 is instructed to perform interpolation processing based on the movement amount of the tool instructed by this instruction block.

The tool movement amount compensating unit 11 calculates the compensating amount $X_{ofs1}$ according to the above calculating method in response to the instruction from the instruction block analyzing unit 10. When calculating the compensating amount $X_{ofs1}$, the tool movement amount compensating unit 11 uses data of the inclination α of the tool in the Y axis direction and a blade edge length L of the tool stored in advance in the tool data storage unit 14. The data stored in the tool data storage unit 14 may be configured to be input and stored as a value measured by an operator by using an input unit which is not illustrated, or may be configured to be input and stored as a value measured by using a sensor.

When the inclination error Err of the tool in the X axis direction at the cutting end point with respect to the cutting start point is stored in the tool data storage unit 14, the tool movement amount compensating unit 11 further calculates the compensating amount $X_{ofs2}$ based on this inclination error Err, and calculates a resultant compensating amount by subtracting the calculated compensating amount $X_{ofs2}$ from the compensating amount $X_{ofs1}$.

Further, the tool movement amount compensating unit 11 compensates the movement amount of the tool instructed by the instruction block analyzed by the instruction block analyzing unit 10, based on the above compensating amount, and instructs the interpolating unit 12 to perform interpolation processing based on the compensated movement amount of the tool.

The interpolating unit 12 generates interpolation data obtained by interpolating and calculating points on an instructed path instructed by the instruction block at an interpolation cycle, based on the instruction from the instruction block analyzing unit 10 or the tool movement amount compensating unit 11, and outputs the generated interpolation data to the servo control unit 13.

The servo control unit 13 drives each servo motor 2 equipped to the machine, based on the interpolation data input from the interpolating unit 12, and relatively move the tool with respect to the workpiece.

Conventionally, when skiving is performed, a NC program instruction is given to realize skiving. By contrast with this, in case of a skiving instruction according to the present invention, as indicated by a flow of bold line arrows in FIG. 6, the instruction block analyzing unit 10 determines whether or not to execute the skiving instruction, and the tool movement amount compensating unit 11 calculates a compensating pulse based on inclinations of the linear blade of the tool in the X axis direction and the Y axis direction measured in advance, the blade edge length L and the instructed movement amount, and outputs the calculated compensating pulse to the interpolating unit 12. In addition, the tool movement amount compensating unit 11 according to the present invention may be mounted as a sub functional unit of the instruction block analyzing unit.

An embodiment according to the present invention has been described above. However, the present invention is not limited to an example of the above embodiment and can be carried out in various modes by adding optional changes.

The invention claimed is:

1. A numerical controller that controls a machine according to a program,
    wherein the machine performs skiving in which cutting is performed by relatively moving a tool with respect to a workpiece in an axial direction of a first axis, an axial direction of a second axis orthogonal to the first axis, and an axial direction of a third axis orthogonal to the first axis and the second axis,
    the workpiece rotates about the first axis, and
    the tool has a linear blade arranged substantially parallel to a plane including the first axis and the second axis and inclined with respect to the first axis,
    the numerical controller comprising:
    a tool data storage unit that stores tool data including at least information on the inclination of the linear blade with respect to the first axis and information on a length of the linear blade;

an instruction block analyzing unit that reads an instruction block from the program, analyzes the instruction block and generates and outputs instruction data indicating a movement amount of the tool on each axis instructed by the instruction block;

a tool movement amount compensating unit that calculates, based on at least the tool data stored in the tool data storage unit, a compensating amount for compensating the movement amount such that an actually-machined taper angle matches a taper angle instructed by an instruction block, and outputs a compensated instruction data which is obtained by compensating the instruction data, output by the instruction block analyzing unit, based on the compensating amount, in case where the instruction block instructs taper machining in which machining is performed such that a machined surface of the workpiece takes a taper angle, formed by the first angle and the third angle, with respect to the first axis, on a plane including the first axis and the third axis; and an interpolating unit that executes interpolation processing based on the instruction data or the compensated instruction data, and generates and outputs interpolation data for every interpolation cycle.

2. The numerical controller according to claim 1, wherein the compensating amount is calculated based on a movement amount of the tool in the axial direction of the first axis, a movement amount of the tool in the axial direction of the third axis, and the tool data in a block in which the taper machining is instructed.

3. The numerical controller according to claim 1, wherein the tool data includes information related to an inclination of the linear blade with respect to the plane including the first axis and the second axis.

* * * * *